United States Patent [19]

Fass et al.

[11] Patent Number: 4,677,460
[45] Date of Patent: Jun. 30, 1987

[54] METHOD AND ARRANGEMENT FOR PRODUCING COMPOSITE LIFE IMAGES, AND SUBIMAGE CARRIER PROVIDED THEREFOR

[76] Inventors: Leon Fass, 47 Knob Hill Rd., Hackettstown, N.J. 07840; Vladimir Loyevsky, 26 Jacoby St., Maplewood, N.J. 07040

[21] Appl. No.: 783,736

[22] Filed: Oct. 3, 1985

[51] Int. Cl.⁴ .................................................. H04N 5/275
[52] U.S. Cl. ............................... 358/22; 358/183; 358/312; 358/335; 358/339; 358/903; 364/523
[58] Field of Search ................ 358/93, 183, 22, 312, 358/335, 339, 903; 364/523

[56] References Cited

U.S. PATENT DOCUMENTS

| | | | |
|---|---|---|---|
| 4,122,490 | 10/1978 | Lish | 358/22 |
| 4,486,774 | 12/1984 | Maloomian | 358/183 |
| 4,530,009 | 7/1985 | Mizokawa | 358/183 |
| 4,539,585 | 9/1985 | Spacova | 358/183 |

Primary Examiner—Howard W. Britton
Attorney, Agent, or Firm—Richard M. Goldberg

[57] ABSTRACT

An image is shot and supplied to a computer, the computer retains a part of the image forming a first subimage and erases the remaining part replacing the same by a color so as to form a background, the background is recorded on a carrier and then supplied to a monitor with a screen on which the background is overlayed with a second subimage so that the second subimage replaces the color of the background.

26 Claims, 3 Drawing Figures

FLOW CHART OF PROGRAM TO COMBINE IMAGES

4,677,460

METHOD AND ARRANGEMENT FOR PRODUCING COMPOSITE LIFE IMAGES, AND SUBIMAGE CARRIER PROVIDED THEREFOR

BACKGROUND OF THE INVENTION

The present invention relates to a method and arrangement for producing composite live images, and also to a subimage carrier therefor.

It is known to produce on a monitor screen a composite image which can thereafter be photographed from the screen or printed by a printer. For producing composite photographs, a plurality of backgrounds are used which are preliminarily made by photography. For producing a composite live image on a monitor screen, special graphic programs are used, which make possible combining of subimages on the screen of the monitor. The first photographic method generally requires extensive preliminary preparatory work, and the number of subimages or backgrounds which can be prepared is limited. The second electronic method requires a lot of time and highly professional skills.

SUMMARY OF THE INVENTION

Accordingly, it is an object of the present invention to provide a method and an arrangement for producing composite life images, which avoids the disadvantages of the prior art.

It is also an object of the present invention to provide a subimage (or background) carrier which can be used in the inventive method and arrangement.

In keeping with these objects and with others which will become apparent hereinafter, one feature of the present invention resides, briefly stated, in a method in accordance with which an image is shot by a videocamera and supplied to a computer, the computer memorizes the image, retains one part of it to form a first subimage and erases the remaining part of it to form a color which is not present in any real image to form a background from the subimage and color, the background is recorded in digital form on a carrier, then the background from the carrier and a second live subimage are supplied onto a monitor screen and overlayed so that the second live subimage replaces the color and a composite live image is formed, including the first and second subimages displayed on the monitor screen. The arrangement in accordance with the present invention includes the videocamera, the computer, the carrier, and the monitor interconnected and cooperating respectively. The invention also includes a carrier which records and stores the first subimage and the color produced by recording an image, retaining a part thereof to form the first subimage and erasing the remaining part to form a color so that the subimage and the color together form a background stored on the carrier.

In accordance with the present invention, a plurality of backgrounds can be produced in advance and supplied to consumers. A consumer can produce a composite image in a matter of seconds and no professional skill is needed. The composite image can then be photographed from the monitor screen or printed by a printer. It is to be understood that the term "monitor" here is used in a broad sense, including T.V., monitors, etc.

The novel features of the present invention are set forth in particular in the appended claims. The invention itself, however, will be best understood from the following description of preferred embodiments which is accompanied by the following drawings.

DESCRIPTION OF A PREFERRED EMBODIMENT

Figure 1:
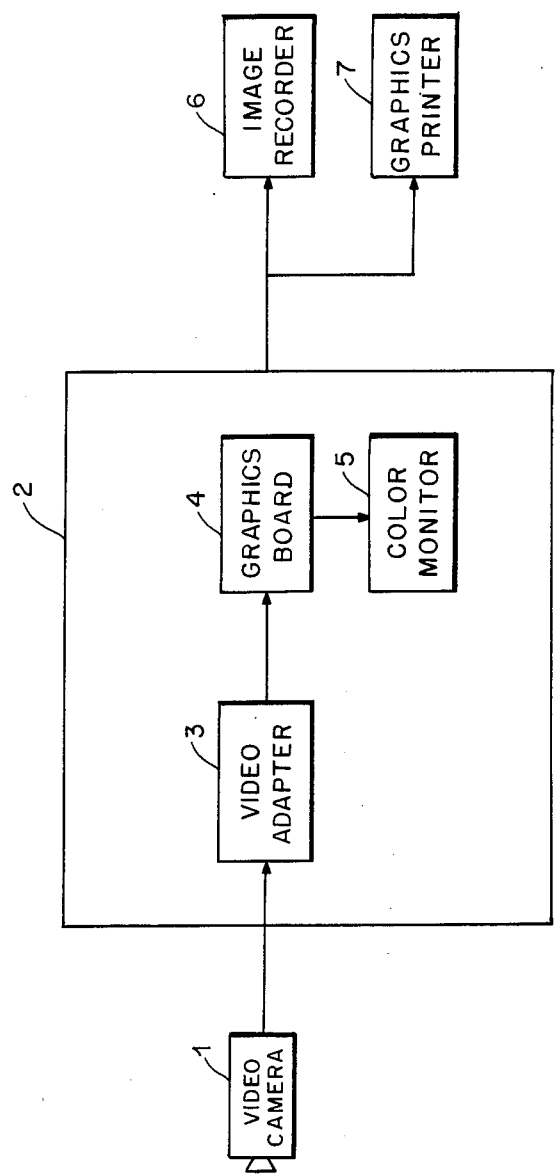
FIG. 1 is a view schematically showing an arrangement for producing composite images in accordance with the present invention.

FIG. 1 schematically shows an arrangement and illustrates a method of producing composite images. A video camera 1 or other source of video signals such as a video tape recorder, a broadcast or other sources of the same is directed to an object of interest of a user and shoots the object, thus forming an image of the object. Video signals from the video camera 1 are supplied to a video computer 2. In the computer 2 the signal is supplied to an adapter 3 which converts the analog signal into a digital signal. Then the digital signal is recorded in a color graphic board 4 which transmits the image to a color monitor 5. In accordance with a command by an operator, the computer memorizes one frame of the video signal corresponding to the shot image.

Figure 2:
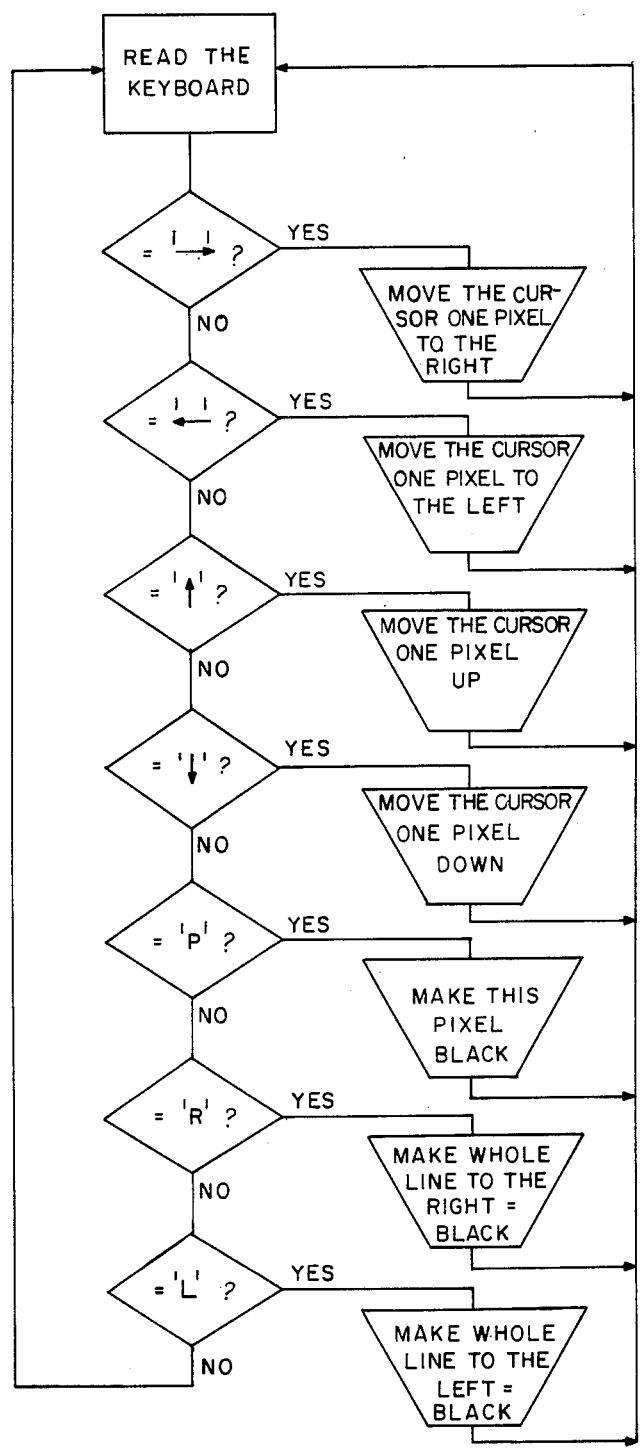
FIG. 2 is a flow chart of a program which is utilized for producing carriers which store backgrounds for producing the composite images.

After this, the operator retains a required part of the image, and replaces the remaining part of the image by a color which is generally not present or is rare in any image, for example absolute white, black, red, etc. This is done in accordance with the program shown in FIG. 2. The operator changes all points outside the retained part of the image to the above mentioned color. All points inside the part to be retained are not changed. To change the color outside the image, the operator moves the cursor left, right, up, down. Then by using the key "p" the operator can change the color of the respective point at a location in which the cursor is located, to a black color. By using the key "R" he can change the color of the area at the right side of the cursor, to a black color. By using the key "L" he can change the color of the area at the left side of the cursor to a black color. Thereby the operator passes through the whole screen. As a result of this, he produces a background which includes a first subimage surrounded by the uniform color.

The thus formed background is recorded on a carrier, such as a diskette, tape, hard disc, etc., and in this form can be supplied to consumers.

Figure 3:
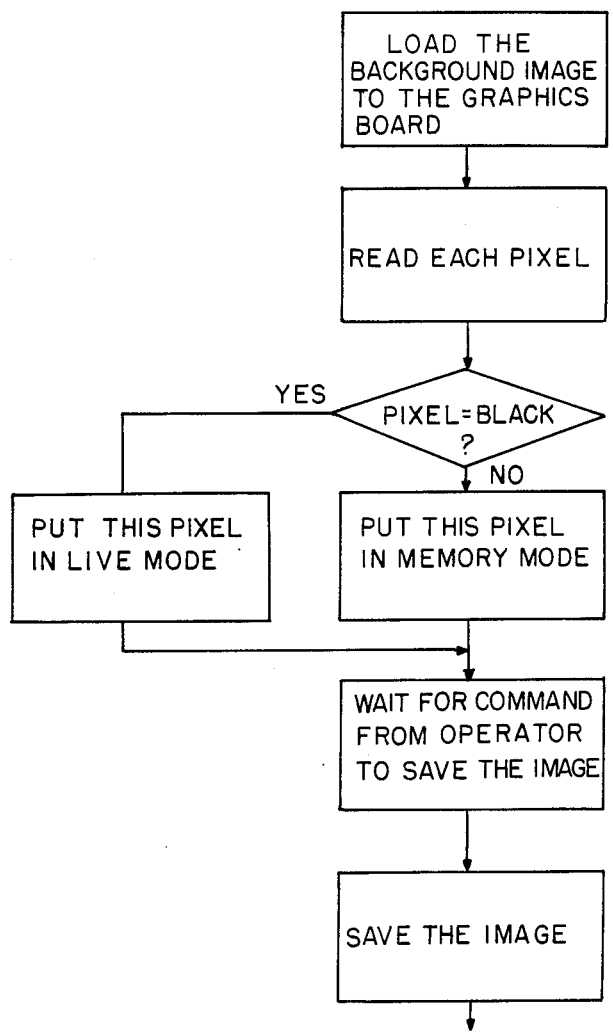
FIG. 3 is a flow chart of a program which is utilized for producing the composite images.

A consumer then produces a composite image. The background is supplied into the computer and the computer operates in accordance with the program shown in FIG. 3. Video camera 1 is directed to another object and a second live subimage is shot by the videocamera and supplied the same way into the computer. With the aid of the video camera the operator adjusts the size and location of the live second subimage so that it corresponds to the background.

Then the computer operates the system in an overlay mode, for overlaying the background and the second subimage on the monitor screen. If a point is not of black color, the first subimage is supplied from the computer memory. If the point is of black color, the second subimage is supplied from the video camera 1. Thereby a composite image is formed can be memorized, photographed, printed by a printer, such as an image recorder 6, graphics printer 7, etc.

The invention is not limited to the details shown since various modifications and structural changes are possible without departing in any way from the spirit of the present invention.

What is desired to be protected by Letters Patent is set forth in particular in the appended claims.

What is claimed is:

1. A method of producing combined live images, comprising the steps of:
   shooting an image by video camera means;
   storing a single frame of said shot image in storage means;
   displaying said stored image on a monitor screen;
   marking selected portions of selected horizontal lines of the displayed image with overlay indicia;
   retaining non-selected portions of said displayed image as a first subimage;
   recording the thus formed overlay indicia and first subimage as a combined subimage in said storage means;
   displaying the combined subimage from the storage means on said monitor screen;
   supplying a video signal corresponding to a second live subimage to said storage means;
   overlaying a portion of the combined subimage corresponding to the overlay indicia and the second live subimage on the monitor screen in response to viewing of the same so that the second live subimage replaces said portion to thereby form a combined image which includes the first subimage and the second subimage;
   terminating the supply of the video signal corresponding to the second live subimage to said storage means; and
   recording the thus formed combined image.

2. A method as defined in claim 1, wherein said step of marking includes the step of replacing selected portions of selected horizontal lines of the displayed image with background color; said first step of recording includes the step of recording the thus formed background color and first subimage as said combined subimage; and said step of overlaying includes the step of overlaying the background color and second live subimage in response to viewing of the same so that the second live subimage replaces the background color to thereby form said combined image.

3. A method as defined in claim 1, wherein said step of storing said single frame includes the step of storing said single frame in memory means of a computer; said step of recording the combined subimage includes the step of recording the combined subimage on a recording medium; and the step of recording the combined image includes the step of producing a hard copy of the combined image.

4. A method as defined in claim 3, wherein said recording medium is one of a diskette, magnetic tape and hard disc.

5. An arrangement for producing combined live images, comprising:
   video camera means for shooting an image;
   storage means for storing a single frame of said shot image;
   monitor means for displaying said stored image;
   means for marking selected portions of selected horizontal lines of the displayed image with overlay indicia and for retaining nonselected portions of said displayed image as a first subimage so as to form a combined subimage which is stored in said storage means;
   means for supplying a video signal corresponding to a second live subimage to said storage means;
   means for overlaying a portion of the combined subimage corresponding to the overlay indicia and a second live subimage on the monitor screen in response to viewing of the same so that the second live subimage replaces said portion to thereby form a combined image, which includes the first subimage and the second subimage; and
   means for recording the thus formed combined image.

6. An arrangement as defined in claim 5, wherein said means for marking includes means for replacing selected portions of selected horizontal lines of the displayed image with background color; said means for overlaying includes means for overlaying said background color and second live subimage on the monitor screen in response to viewing of the same so that the second live subimage replaces the background color to thereby form said combined image.

7. An arrangement as defined in claim 5, wherein said means for recording the combined image includes means for producing a hard copy of the combined image.

8. An arrangement as defined in claim 5, wherein said storage means includes memory means of a computer for storing said single frame of said shot image, and a recording medium for recording the combined subimage.

9. An arrangement as defined in claim 8, wherein said recording medium is one of a diskette, magnetic tape and hard disc.

10. Apparatus as defined in claim 8, wherein said recording medium is one of a diskette, magnetic tape and hard disc.

11. Apparatus for producing a combined subimage which is used in forming a combined live image comprised of a first subimage of said combined subimage and a second live subimage, said apparatus comprising:
    video camera means for shooting an image;
    storage means for storing a single frame of said shot image;
    monitor means for displaying said stored image; and
    means for marking selected portions of selected lines of the displayed image with overlay indicia and for retaining non-selected portions of said displayed image as a first subimage so as to form said combined subimage which is stored in said storage means.

12. Apparatus as defined in claim 11, wherein said means for marking includes means for replacing selected portions of selected horizontal lines of the displayed image with background color.

13. Apparatus as defined in claim 11, wherein said storage means includes memory means of a computer for storing said single frame of said shot image, and a recording medium for recording the combined subimage.

14. Apparatus for producing a combined image from a combined subimage comprised of a first subimage and overlay indicia stored in storage means, and a second live subimage, said apparatus comprising:
    a monitor screen;
    means for supplying a video signal corresponding to said second live subimage to said storage means;

means for overlaying a portion of the combined subimage corresponding to the overlay indicia and a second live subimage in response to viewing of the same on said monitor screen so that the second live subimage replaces said portion to thereby form said combined image, which includes the first subimage and the second subimage; and means for recording the thus formed combined image.

15. Apparatus as defined in claim 14, wherein said overlay indicia is formed by background color; and said means for overlaying includes means for overlaying said background color and second live subimage in response to viewing of the same on the monitor screen so that the second live subimage replaces the background color to thereby form said combined image.

16. Apparatus as defined in claim 14, wherein said means for recording the combined image includes means for producing a hard copy of the combined image.

17. Apparatus as defined in claim 14, wherein said storage means includes a recording medium for recording the combined subimage.

18. Apparatus as defined in claim 17, wherein said recording medium is one of a diskette, magnetic tape and hard disc.

19. A method of producing a combined subimage which is used in forming a combined live image comprised of a first subimage of said combined subimage and a second live subimage, said method comprising the steps of:

shooting an image by video camera means;

storing a single frame of said shot image in storage means;

displaying said stored image on a monitor screen;

marking selected portions of selected horizontal lines of the displayed image with overlay indicia;

retaining non-selected portions of said displayed image as a first subimage; and recording the thus formed overlay indicia and first subimage as a combined subimage in said storage means.

20. A method as defined in claim 19, wherein said step of marking includes the step of replacing selected portions of selected horizontal lines of the displayed image with background color; and said step of recording includes the step of recording the thus formed background color and first subimage as said combined subimage.

21. A method as defined in claim 19, wherein said step of storing said single frame includes the step of storing said single frame in memory means of a computer; and said step of recording the combined subimage includes the step of recording the combined subimage on a recording medium.

22. A method as defined in claim 21, wherein said recording medium is one of a diskette, magnetic tape and hard disc.

23. A method of producing a combined image from a combined subimage comprised of a first subimage and overlay indicia stored in storage means, and a second live subimage, said method comprising the steps of:

displaying the combined subimage from the storage means on a monitor screen;

supplying a video signal corresponding to a second live subimage to said storage means;

overlaying a portion of the combined subimage corresponding to the overlay indicia and the second live subimage in response to viewing of the same on the monitor screen so that the second live subimage replaces said portion to thereby form a combined image which includes the first subimage and the second subimage;

terminating the supply of said video signal corresponding to the second live subimage to said storage means; and recording the thus formed combined image.

24. A method as defined in claim 23, wherein said marking indicia is formed by background color; and said step of overlaying includes the step of overlaying the background color and second live subimage in response to viewing of the same on the monitor screen so that the second live subimage replaces the background color to thereby form said combined image.

25. A method as defined in claim 24, wherein said step of recording the combined image includes the step of producing a hard copy of the combined image.

26. A method as defined in claim 25, wherein said recording medium is one of a diskette, magnetic tape and hard disc.

* * * * *